United States Patent [19]

Wagner

[11] 4,065,765

[45] Dec. 27, 1977

[54] PULSE-WIDTH DEMODULATOR AND INFORMATION STORAGE DEVICE

[75] Inventor: Peter B. Wagner, Reno, Nev.

[73] Assignee: The United States of America as represented by the Secretary of the Navy, Washington, D.C.

[21] Appl. No.: 603,777

[22] Filed: Aug. 11, 1975

[51] Int. Cl.² .............................................. G06F 3/00
[52] U.S. Cl. ............................................ 340/347 DD
[58] Field of Search .................... 340/167 A, 347 DD; 178/26 A, 66, 67, 68; 179/15 AW, 15.55 T, 15 AQ; 328/112, 111; 360/44; 235/92 SH

[56] References Cited

U.S. PATENT DOCUMENTS

| | | | |
|---|---|---|---|
| 2,870,429 | 1/1959 | Hales | 340/167 A |
| 3,263,030 | 7/1966 | Stiefel | 179/15 AQ |
| 3,789,137 | 1/1974 | Newell | 179/15.55 T |
| 3,823,397 | 7/1974 | Howard | 178/26 A |

Primary Examiner—Charles D. Miller
Attorney, Agent, or Firm—R. S. Sciascia; Charles D. B. Curry

[57] ABSTRACT

A pulse-width demodulator and information storage device including a data processing clocking system and an independent data readout and recorder control clocking system. The data input may comprise a pair of words for each data collection cycle. By means of an index signal, which is synchronized with the data input, the device distinguished between each word of the data pair being processed. The device converts each pulse-width modulated word into a digital format and stores each pair of words alternately in one of a pair of shift registers. The readout is alternately from the other of the pair of shift registers to the recorder on command from the recorder.

10 Claims, 5 Drawing Figures

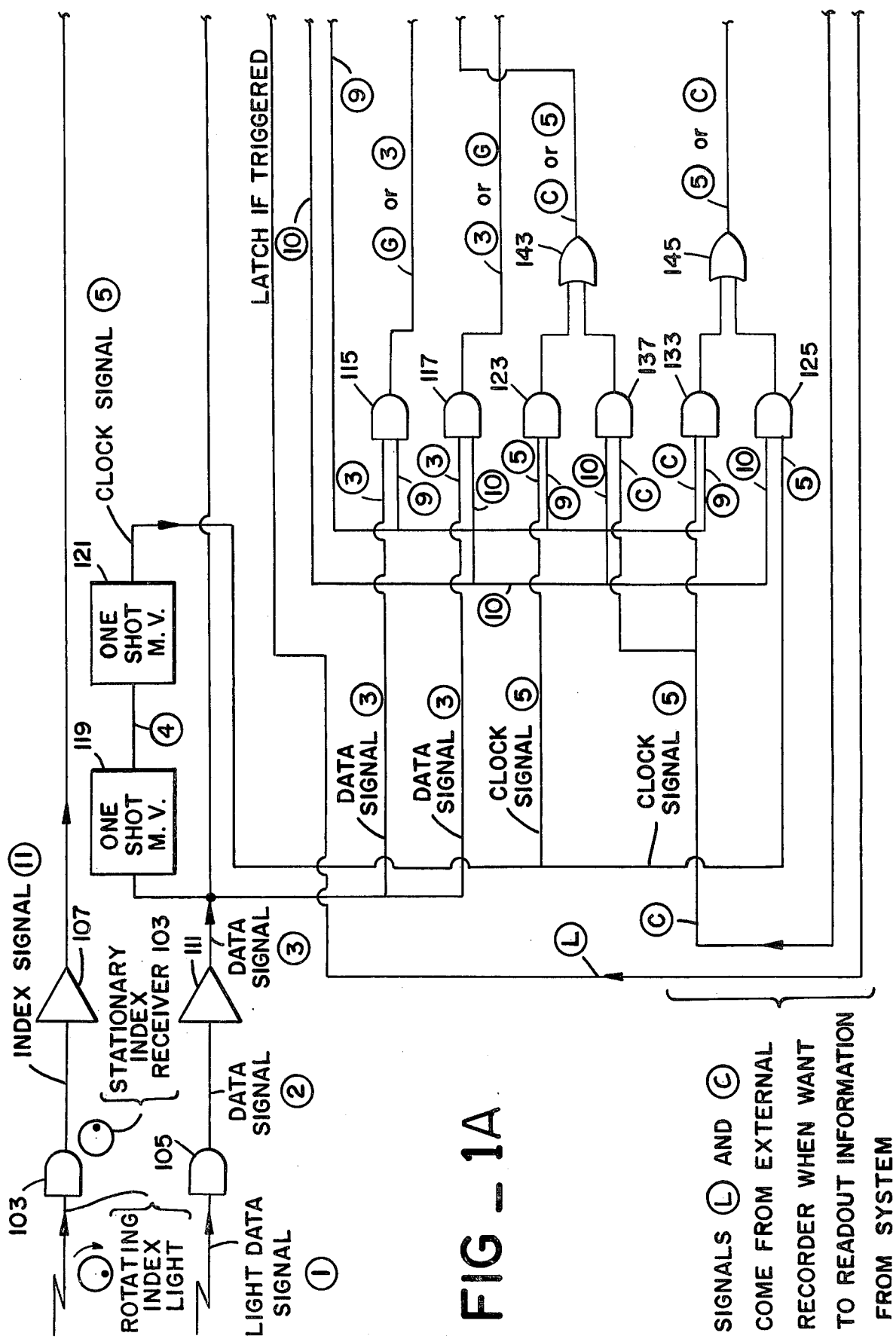

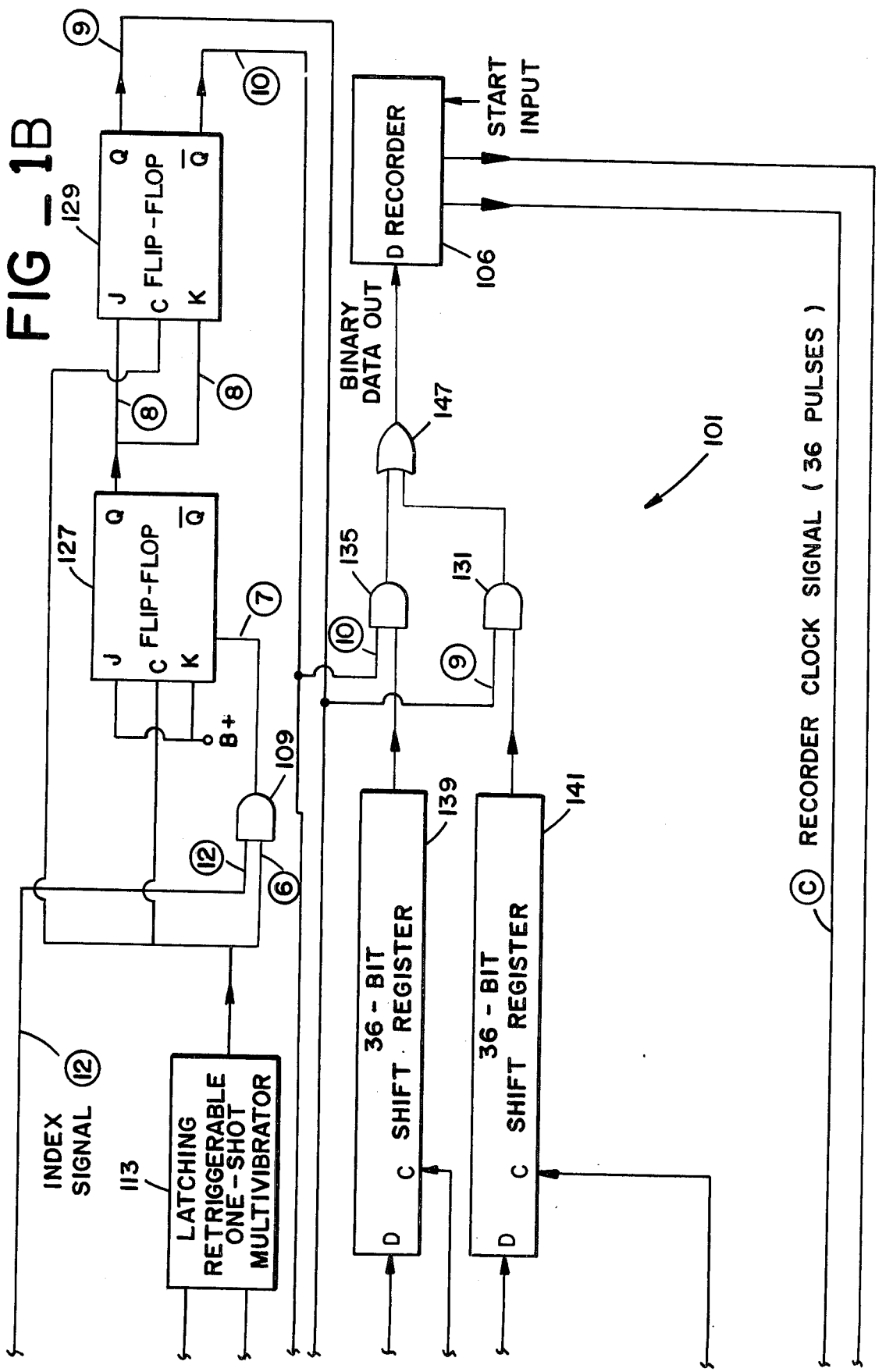

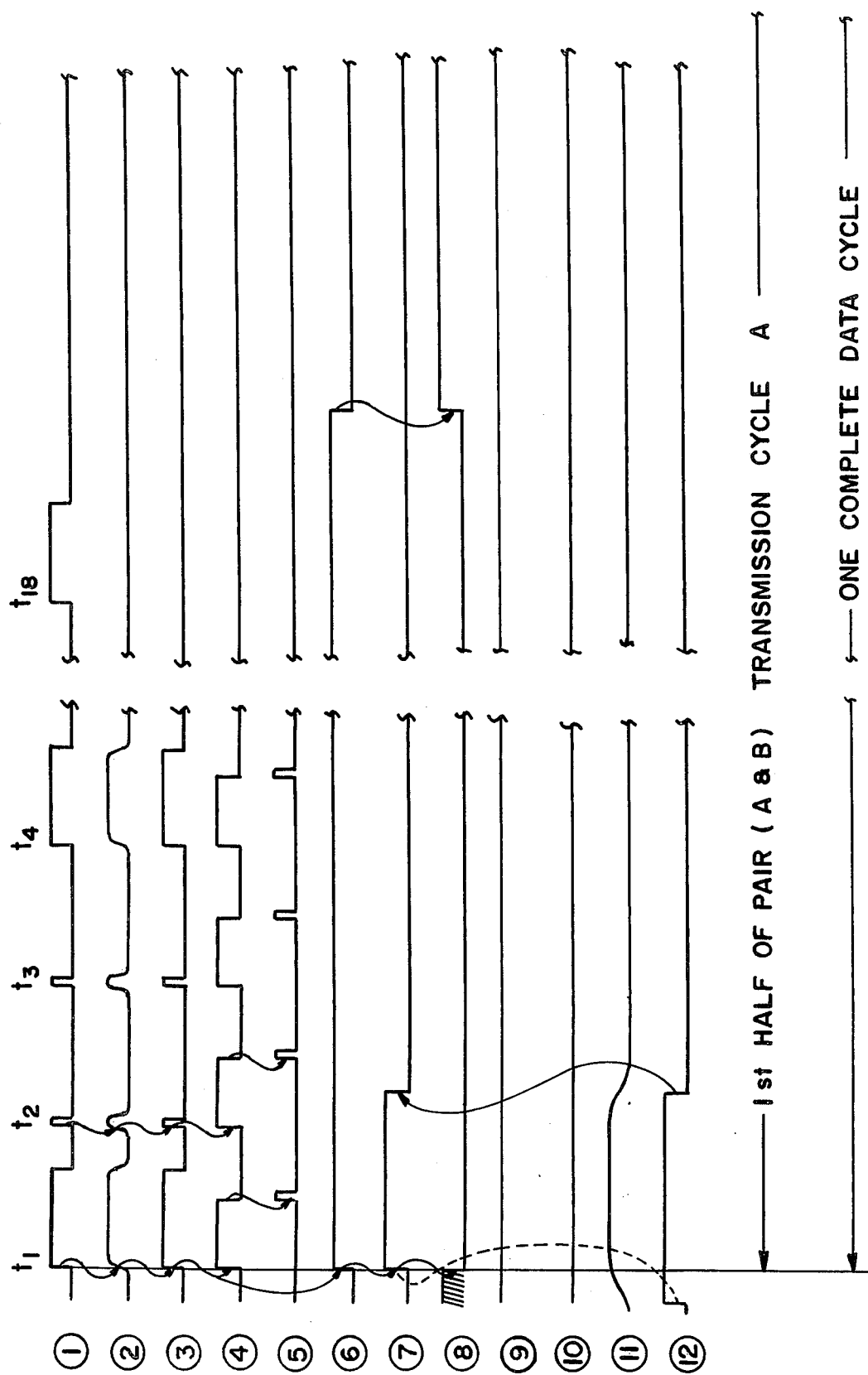
FIG_3B

PULSE-WIDTH DEMODULATOR AND INFORMATION STORAGE DEVICE

BACKGROUND OF THE INVENTION

1. Field of the Invention

The present invention relates to a pulse-width demodulator and information storage device and more particularly to a pulse-width demodulator and information storage device that converts and stores pulse-width modulated data into digital data and can distinguish between the words of pairs of received words.

2. Description of the Prior Art

One type of prior pulse-width demodulators and information storage devices have had the disadvantage of attempting to use a single clock for controlling the transmitted data and for controlling the recorder and the clocking out of the stored data to the recorder. The difficulty encountered with these type devices has been in attempting to synchronize these two controls to a single clock. Other prior systems have used dual clocks to control the dual systems and a serial buffer to store the binary data. The disadvantage with these systems has been that the buffer often contains much unwanted data and the readout to the recorder includes both the wanted data and the unwanted data. In addition, other systems have been generally very complex.

The present invention overcomes these difficulties by providing a relatively simple system that employs a pair of asynchronous clocking systems. One clocking system is used for controlling the transmitted data and the other independent clocking system is used for controlling the recorder and clocking out the stored data to the recorder. In addition, the storage and readout system provides for readout of only wanted data and eliminates the readout of unwanted data.

SUMMARY OF THE INVENTION

Briefly, the present invention comprises a pulse-width demodulator and information storage device including a data processing clocking system and an independent data readout and recorder control clocking system. The data input may comprise a pair of words for each data collection cycle. By means of an index signal, which is synchronized with the data input, the device distinguished between each word of the data pair being processed. The device converts each pulse-width modulated word into digital format and stores each pair of words alternately in one of a pair of shift registers. The readout is alternately from the other of the pair of shift registers to the recorder on command from the recorder.

STATEMENT OF THE OBJECTS OF THE INVENTION

An object of the present invention is to provide a relatively simple pulse-width demodulator and information storage device;

Another object of the present invention is to provide a highly reliable pulse-width demodulator and information storage device;

Still another object of the present invention is to provide a pulse-width demodulator and information storage device that employs a pair of asynchronous clocking systems, one for controlling the transmitted data and the other for controlling the recorder and clocking out the stored data to the recorder;

A further object of the present invention is to provide a pulsewidth demodulator and information storage system that stores and reads out only wanted data;

A still further object of the present invention is to provide a pulse-width demodulator and information storage device that converts and stores the pulse width modulated information into digital information;

Other objects, advantages and novel features of the present invention will become apparent from the following detailed description of the invention when considered in conjunction with the accompanying drawings wherein:

BRIEF DESCRIPTION OF THE DRAWINGS

FIGS. 1A and 1B are together a schematic diagram of the pulse-width demodulator and information storage device of the present invention;

FIGS. 3A and 3B are together a timing diagram illustrating the operation of the pulse-width demodulator and information storage device of FIG. 1 when it is receiving and processing the type of information shown in FIG. 2.

DESCRIPTION OF THE PREFERRED EMBODIMENT

Figure 2:
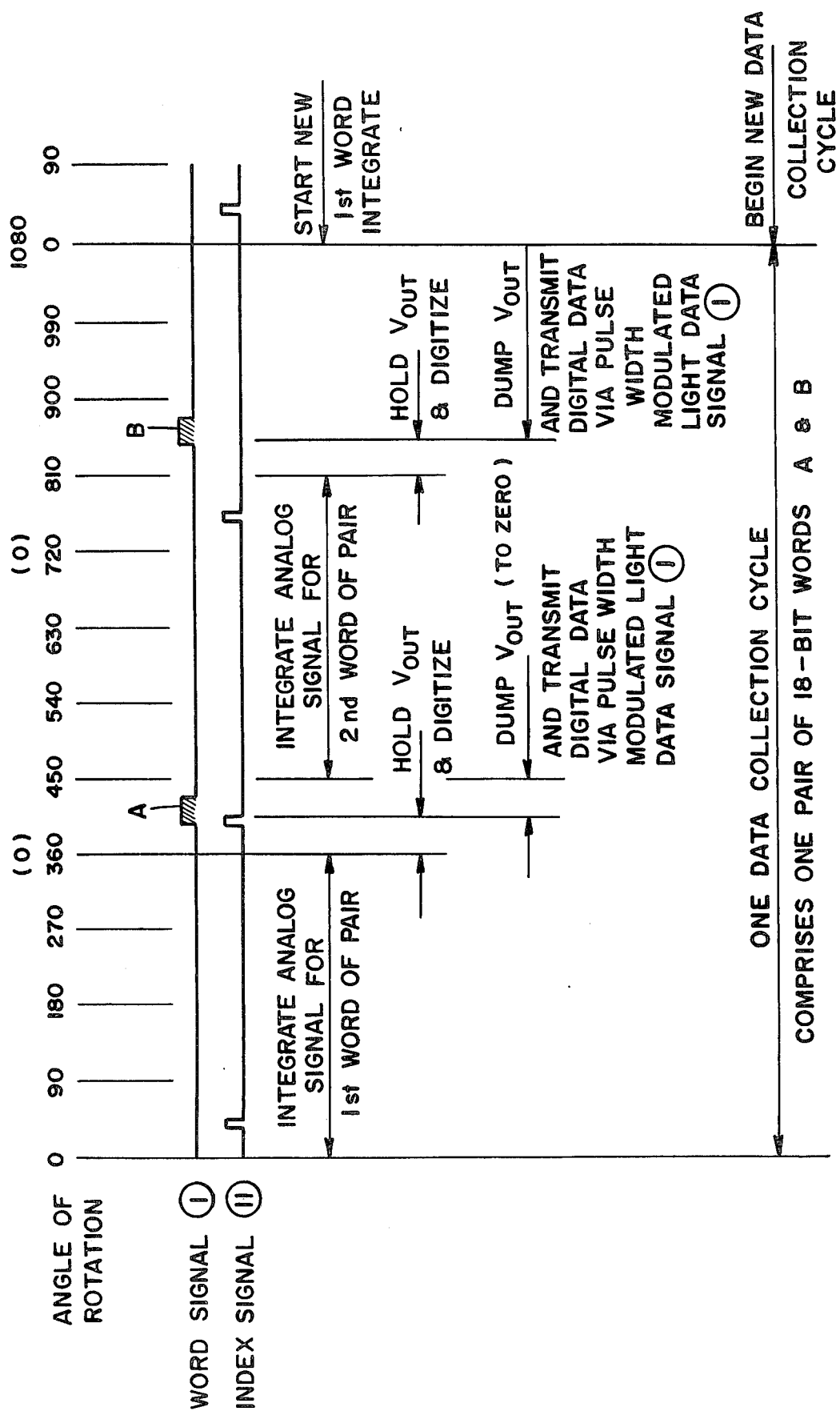
FIG. 2 is a timing diagram that shows one type of information that may be received and processed by the pulse-width demodultor and storage device of FIG. 1.
Figure 3A:
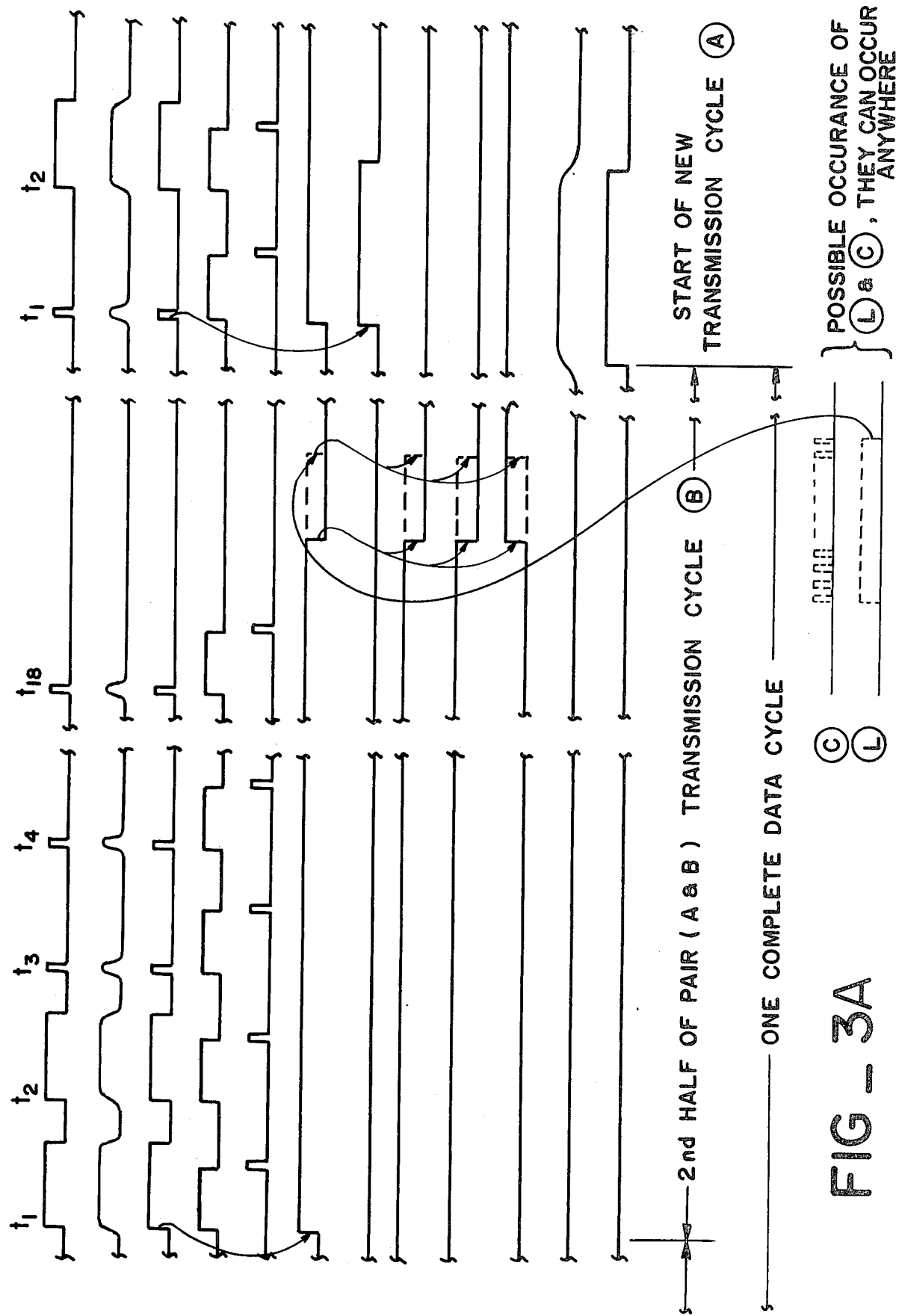

In FIG. 1 is shown a schematic diagram of the pulse-width demodulator and information storage device 101 of the present invention. In FIG. 2 is illustrated a timing diagram that shows one type of information that may be received and proessed by the pulse-width demodulator and storage device 101. In FIG. 3 is illustrated a timing diagram illustrating the operation of the pulse-width demodulator and information storage device 101 when receiving and processing the information shown in FIG. 2.

It is to be understood that any type of pulse-width modulated data and an accompanying index or reference signal (referred to as signal 11 in FIGS. 1 and 2) may be proessed by the pulse-width demodulator and storage device of the present invention. Frequently, data is pulsewidth modulated when it is desired to transmit binary data such as 1's and 0's. That is, a 1 is represented by a long pulse and a zero is represented by a short pulse or vice versa. The present invention is illustrated as processing 18-bit words; however, it will be obvious to one skilled in the art that it may be readily modified to process shorter or longer binary words.

The primary function of the pulse-width demodulator and information storage device 101 of the present invention is to receive pulse width modulated information, convert the pulse-width modulated information into digital information, store the digital information and then read out the stored digital information to a recorder or other device upon demand by the recorder or other device.

One of the major difficulties encountered in transmitting information from a remote sensor to a recorder is the required synchronizing of the clock pulses that control the processing of the sensor information with the clock pulses that process the information for readout to the recorder and for controlling the recorder. One of the unique features of the present invention is that it permits the processing of the sensor information by one clock timing system and the processing of the information for readout to the recorder and for controlling the recorder by a separate clock timing system. Typically, other type systems that employ a dual clock system have stored the digital information in a serial buffer. Therefore, when the recorder reads out this serially stored information it must read out all of the stored information, much of which may be undesirable or unwanted information. One of the unique aspects of the present invention is that it employs a dual clock system that reads out, on demand of the recorder, only the wanted or desired information. Therefore, the problems associated with synchronizing a single clock system are avoided and the problem of obtaining unwanted information in a dual clock system are also avoided.

In order to more fully understand the pulse-width demodulator and information storage device 101 of the present invention, a description will be first given of one type of input information it may be used to process. A detailed description of one type of input information that may be processed by the present invention is completely shown and described in co-pending patent application Ser. No. 486,035, filed July 5, 1974, entitled Electric Field Measuring Device by Peter B. Wagner et al; copending patent application (Navy Case Number 58,393) Ser. No. 592,852, filed July 2, 1975, entitled Analog Signal Processor by Peter B. Wagner; and copending patent application (Navy Case Number 58,394) Ser. No. 592,851, filed July 2, 1975, entitled Digital Signal Processor by Peter B. Wagner.

Before considering the details of the schematic diagram of FIG. 1 it is considered desirable to describe the nature of the information that may be received by reference or index receiver 103 and data receiver 105. In general, the index signal is used to identify a particular word or pairs or words received by data receiver 105. Although the present invention may be used on any type of indexed pulsewidth modulated incoming information, FIG. 2 shows it use with an electric field measuring device (such as shown in Ser. No. 486,035) or other rotating type devices where information is desired to be known at at least one or two different positions in one 360° revolution. More particularly and in the present example the index signal 11 is used to distinguish when a revolution of information is taken from a 0° starting position as compared to when it is taken from a 90° starting position. These 0° and 90° starting positions are frequently used for measuring and analyzing atmospheric electric fields. However, it will be understood that the reference or index signal will not be required if it is not necessary to know the particular orientation being measured.

In the more general sense, it is to be understood that the present invention may be used to process pairs of pulse-width modulated information wherein one pair makes up a complete cycle of information. The pair may comprise a data word A and a data word B. It is to be understood that the information contained in data words A and B may be from any two sources such as temperatures sensors, pressure sensors and the like.

As illustrated in FIG. 1 the data output to the recorder 106 is shown as having a hard line connection which means that the recorder will serially record binary 1's and 0's. It is to be understood that the binary data output may be applied to the input of many different types of devices for further processing. One example would be the transmission of this binary data to a digital to analog convertor for transmission to an analog recorder, for example. The binary data output may be also connected to telemetry equipment, where it may be pulse-width modulated, or frequency or phase modulated, for radio transmission to remote locations.

In the specific example of FIG. 2, three complete 360° revolutions of data collection and processing are shown. Together these three revolutions comprise one data collection cycle. This data collection cycle is then repeated. Each data collection cycle is illustrated as including a pair of 18-bit words A and B. The 18-bit word A represents data starting from 0° (or 360° or 720°, etc.) and the other 18-bit word B represents data starting from 450° (810°, etc.). In the FIG. 2 example, the analog signal is being integrated from 0° to 360° for the first word A. The maximum value $V_{out}$ of the integrated analog signal is then held and converted into an 18-bit digital word and during the dump period the $V_{out}$ signal is returned to zero and the 18-bit digital word is converted into a 18-bit pulse-width modulated word A that is transmitted serially by a light beam, for example, to data receiver 105 of FIG. 1. Many different types of digital to pulse-width modulated processor are known that may perform the above described function. However, the Digital Signal Processor described in co-pending patent application Ser. No 592,851, filed July 2, 1975, has been found to be particularly suited for this purpose. This transmitted light beam signal is shown as light data signal 1 in FIGS. 1, 2 and 3 and includes pairs of 18-bit pulse-width modulated words A and B. It should be noted that the index signal 11 occurs during the beginning of the dump and transmit period of the 18-bit word A and does not occur during dump and transmit period of the 18-bit word B. This is done to distinguish between the A and B words where the A word starts at 0° and the B word starts at 90°. This operation will be hereinafter more completely described.

During the second revolution of the three revolution cycle, the analog signal is being integrated from 450° to 810° (that is, 90° displaced from the first word A). The maximum valve $V_{out}$ of the integrated analog signal is then held and converted into an 18-bit digital word and during the dump period the $V_{out}$ signal is returned to zero and the 18-bit digital word is converted into an 18-bit pulse-width modulated word B that is serially transmitted by a light beam, for example, to data receiver 105 of FIG. 1. At the end of this dump and transmit period the process is then repeated. It should be noted that the dump and transmit period for the B signal is 180° longer than for the A signal so that the next data collection cycle starts at 1080° or 0°.

The pulse-width demodulator and information storage device 101 of the present invention will be now described primarily by reference to FIGS. 1 and 3. Referring to FIG. 1, the light index signal is received by light receiver 103. In FIG. 1 is schematically illustrated one technique for generating this index signal. That is, a rotating index light will impinge upon a stationary index light receiver and thereby generate an index signal once each revolution of the rotating index light. Light receiver 103 provides an output index signal 11 which is applied to the input of schmidt trigger circuit 107. The function of schmidt trigger circuit 107 is to shape and amplify, if desired, the index signal 11. This shaped and amplified signal is shown as index signal 12 in FIGS. 1 and 3 and is applied to one input of AND gate 109 for reasons which will be hereinafter described.

The transmitted pulse-width modulated light signal 1, containing the data as previously described, is applied to the input of data receiver 105. The output data signal 2 of data receiver 105 is applied to the input of schmidt trigger circuit 111 the output signal 3 of which is applied to one input of latching retriggerable one-shot multivibrator 113. The function of schmidt trigger circuit 111 is to shape and amplify, if necessary, its input signal as shown by comparing signal 2 and signal 3 of FIG. 3. The output of schmidt trigger circuit 111 is also applied to one input of AND gate 115 and to one input of AND gate 117. The output of schmidt trigger circuit 111 is also applied to the input of one-shot multivibrator 119 the output signal 4 of which is applied to the input of one-shot multivibrator 121. The output signal 5 of one-shot multivibrator 121 is a clock signal for the FIG. 1 device and is derived from and synchronized with the data signal 1. Referring to FIGS. 1 and 2 it should be noted that the leading edge of signal 1 starts signal 2, the leading edge of signal 2 starts signal 3, the leading edge of signal 3 starts signals 4 and 6 and the trailing edge of signal 4 starts signal 5. This is depicted in FIG. 3 by the curved arrows interconnecting signals 1 through 5. The time constants for one-shot multivibrators 119 and 121 are selected to provide pulse time durations approximately as shown in FIG. 3. From this it can be seen that the system is provided with a clock pulse signal 5 that is synchronized with the data signal 1. However, it should be noted that pulses of clock signal 5 occur during the long pulses of data signal 3 but do not occur during the short pulses of data signal 3. It should be also noted that clock signal 5 is independent from recorder clock signal C which is independently derived in recorder 106. Clock signal 5 is applied to one input of AND gate 123 and to one input of AND gate 125.

Latching retriggerable one-shot multivibrator 113 provides an output signal 6 that is applied to one input of AND gate 109, to the clock input C of flip-flop circuit 127, and to the clock input C of flip-flop circuit 129. Each of flip-flop circuit 127 and 129 have two data inputs (J an K) and two outputs (Q and $\overline{Q}$). A B+ power source is connected to both data inputs of flip-flop circuit 129. The Q output of flip-flop circuit 127, having a state that is opposite from the state of the $\overline{Q}$ output, is not used. The Q output signal 8 of flip-flop 127 is connected to both of the J and K data inputs of flip-flop 129. The Q output signal 9 of flip-flop circuit 129 is connected to one input of AND gate 131, to one input of AND gate 115, to one input of AND gate 123 and to one input of AND gate 133. The $\overline{Q}$ output signal 10, having a state that is opposite from the Q output signal 9, is applied to one of the inputs of AND gate 135, to one input of AND gate 117, to one input of AND gate 137 and to one input of AND gate 125.

External recorder 106 provides a recorder clock sigal C, having a series of 36 clock pulses, that is applied to one input of AND gate 133 and to one input of AND gate 137.

The output of AND gate 115 is connected to the data input D of 36-bit shift register 139. The output of AND gate 117 is connected to the data input D of 36-bit shift register 141. The outputs of AND gates 123 and 137 are connected to the respective inputs of OR gate 143 the output of which is connected to the clock input C of shift register 139. The outputs of AND gates 133 and 125 are connected to the respective inputs of OR gate 145 the output of which is conncted to the clock input C of shift register 141.

The output of shift register 139 is connected to one input of AND gate 135. The output of shift register 141 is connected to one input of AND gate 131. The outputs of AND gates 135 and 131 are connected to the respective inputs of OR gate 147 the output of which is connected to the data input D of recorder 106. The output of OR gate 147 will be the binary data being shifted out of data shift register 139 or the binary data being shifted out of shaft register 141.

OPERATION

Referring to FIGS. 1, 2 and 3, the shaped pulse-width modulated data signal 3 is continuously applied to the inputs of AND gates 115 and 117 when data is being received. Data signal 3 contains in series the A word containing 18-bits of pulse-width modulated data and then the B word containing 18-bits of pulse-width modulated data which together make up a complete data collection cycle as previously described. As shown by the curved arrows of FIG. 3, the leading edge of the data signal 3 turns on latching retriggerable one-shot multivibrator 113 thereby providing an output signal 6. This output signal 6 stays on until after the termination of the 18-bit A word pulse train. Signal 6 is normally terminated by selecting an appropriate internal time constant after the 18th bit has been received. The trailing edge of signal 6 toggles and therefore reverses the states of Q and $\overline{Q}$ of flip-flop circuit 127. The trailing edge of signal 6 also toggles the Q and $\overline{Q}$ state of flip-flop circuit 129 when signal 8 is on.

Referring to FIGS. 1 and 3 the coincidence of shaped index signal 12 and signal 6 will provide a reset signal 7 through AND gate 109 that is applied to the reset output of flip-flop circuit 127. This will turn off the Q output signal 8 from flip-flop circuit 127. This is necessary to correct an error if the initial state of the Q output of flip-flop circuit 127 is on at the start of the A period of operation. This is illustrated by the hatched lines at the start of signal 8 in FIG. 3. This also functions to distinguish the A data from the B data since signal 8 must be off for the A data and on for the B data.

Referring to AND gate 123 it should be noted that when the clock signal 5 is on and the Q output signal 9 is on that the clock signal 5 will be applied through OR gate 143 to the clock input C of shift register 139. Therefore, the output of AND gate 115 will be shifted into shift register 139. If data signal 3 is on and the Q output signal 9 is on then the pulse-width data on data signal 3 will be shifted into shift register 139 in binary form. Referring to FIG. 3 it can be seen that the clock pulse 5 will shift a 1 into shift register 139 when a long data pulse on signal 3 occurs because the clock pulse 5 occurs simultaneously with the long data pulse. However, the clock pulse 5 will shift a zero 0 into shift register 139 when a short data pulse on signal 3 occurs because the clock pulse 5 does not occur simultaneously with the short data pulse. Therefore, when the clock signal 5 and the data signal 3 are being applied to shift register 139 a series of 36 bits of 1's and 0's, corresponding to the long and short pulses of data signal 3, will be shifted into shift register 139. This 36-bit group consists of the A and B words of one complete transmision cycle. It should be noted that the A word is first shifted in which is then followed by the B word. This is essential for proper data evaluation. However, it would be equally acceptable if the B word was always first shifted in and then followed by the A word. This would require system modifications which would be obvious to one skilled in the art. During the period when the data signal 3 is being shifted into shift register 139, data signal 3 will not be shifted into shift register 141 because the $\overline{Q}$ output signal 10 will be off.

Conversely, when the data signal 3 is on and $\overline{Q}$ output signal 10 is on then AND gate 117 will present the pulse-width data of data signal 3 to the data input D of shift register 141. When this occurs 36 bits of corresponding digital 1's and 0's will be shifted into shift register 141 because clock signal 5 will be on and the $\overline{Q}$ signal 10 will be on and both will be applied to the input of AND gate 125 which therefore provides a clock signal 5 through OR gate 145 to the clock input C of shift register 141.

In summary, while a data signal 3 is on the corresponding 36-bit binary data (words A and B) will be shifted into either shift register 139 or shift register 141 depending respectively on whether the Q signal 9 is on (and Q signal 10 is off) or $\overline{Q}$ signal 10 is on (and Q signal 9 is off).

When the recorder clock signal C is on, which is started upon recorder demand at any point in time during a data cycle, it is applied to the respective inputs of AND gates 133 and 137. Therefore, when the $\overline{Q}$ signal 10 is on the recorder clock signal C will be applied through AND gate 137 and OR gate 143 to the clock input C of shift register 139. At this time the output of AND gate 115 will provide no output signal, or will be at ground G, and the clock signal C will provide 36 clock pulses and shift out all of the binary data stored in shift register 139 and shift into shift register 139 a group of 36 0's in series. The binary data from shift register 139 will be shifted through AND gate 135, since the $\overline{Q}$ signal 10 is on, and through OR gate 147 to the data input D of recorder 106. It should be particularly noted that the output shift rate of shift register 139 corresponds to and is synchronized with the operation and control rate of recorder 106 since they are both controlled by recorder clock signal C.

Conversely, when the Q signal 9 is on, the recorder clock signal C will be applied through AND gate 133 and OR gate 145 to the clock input C of shift register 141. At this time the output of AND gate 117 will provide no output signal, or will be at ground G, and the clock signal C will provide 36 clock pulses and shift out all of the binary data stored in shift register 141 and will shift into shift register 141 a group 36 0's in series. The binary data from shift register 141 will be shifted through AND gate 131, since the Q signal 9 is on, and through OR gate 147 to the data input D of recorder 106. It should be particularly noted that the output shift rate of shift register 141 corresponds to and is synchronized with the operation and control rate of recorder 106 since they are both controlled by recorder clock signal C. Digital words A and B, 18 bits each, normally represent a pair of signals related in time or in other ways. It is desirable to preserve the relationship between the two words by grouping them in one 36-bit word as held by shift register 139 or 141. Thus the 18 bits of the A word is the first series of bits entered in shift register 139 or 141 and followed by the 18 bits of the associated B word.

Referring to FIGS. 1, 2 and 3, shaped signal 12 is in coincidence with signal 6 at the beginning of the A word transmission cycle only. The resulting output of AND gate 109 resets flip-flop circuit 127 thereby starting the counting process. The process results in flip-flop circuit 129 changing state only after completion of transmission of the B word.

The time duration of the L signal is selected to be about the same as the time duration of the 36-bit recorder clock pulse train C. The L signal is applied to the latch input of latching retriggerable one-shot multivibrator 113. Therefore, when data is being clocked out of either shift register 139 or 141 by recorder clock signal C then the L signal will be applied to the latch input of latching retriggerable multivibrator 113 and will assure that signal 6 will be on for the full time duration of clock signal C even though the 18th bit of signal 3 had previously terminated. It should be noted that this condition will arise only when the recorder clock signal C occurs during the time period shown by the C and L curves at the bottom of FIG. 3. At other selected readout times by recorder 106 the L signal will have no effect. It should be noted that signal L, by itself, will not initiate signal 6. This is done to prevent flip-flop circuit 129 from changing until the data transmission to the recorder is complete.

In view of the foregoing it can be seen that a unique pulse-width demodulator and information storage device is provided. It will be obvious to those skilled in the art that various modifications can be made and still be within the scope of the present invention. Some of the modifications have been previously mentioned. However, it should be noted that the present invention may be used to process more than 2 groups of words that together make up a complete data collection cycle. For example, 3 words A, B and C may comprise the group. Moreover, the bit length could be more or less than 36 bits. The basic modifications that would be required would be in expanding the counter (now consisting of flip-flops 127 and 129) to a larger number that would be responsive to the number of words in the data collection cycle. It should be also noted that the present invention can process an A word having a bit length of from 1 bit to 35 bits and a B word length of from 35 bits to 1 bit, without change to any of the circuits. However, it would be necessary that the combined length of the A and B words equal 36 bits. If not, it would be only necessary to change the length of the shift registers to correspond to the combined bit length.

What is claimed is:

1. A pulse-width demodulator and information storage device for processing a series of at least a first pair and a second pair of pulse-width modulated words comprising:
   a. first data means for receiving said pairs of pulse-width modulated words;
   b. a first clocking means responsive to the output of said first means for generating first clock signal pulses that are synchronized with the pulses of said pairs of pulse width modulated words;
   c. a first shift register;
   d. a second shift register;
   e. second means responsive to the output of said first data means and to output of said first clocking means for alternately shifting said first pair of words into said first shift register and then shifting said second pair of words into said second shift register; and
   d. third means for alternately shifting said first pair of words out of said first shift register and then shifting said second pair of words out of said second shift register.

2. The device of claim 1 wherein:
   a. said pulse width modulated words are comprised of long pulses and short pulses; and b. said first clock signals are coincident with said long pulses but are not coincident with said short pulses.

3. The device of claim 2 wherein:
a. said first clocking means including a first one-short multivibrator responsive to the output of said first data means and a second one-shot multivibrator responsive to the output of said first one-shot multivibrator;
b. said first one-shot multivibrator being responsive to the leading edge of both said long pulses and said short pulses of said pulsewidth modulated words;
c. the time constant of said first one-shot multivibrator being less than said long pulses and more than said short pulses; and
d. said second one-shot multivibrator being responsive to the trailing edge of said first one-shot multivibrator.

4. The device of claim 2 wherein:
a. said second means includes a third multivibrator responsive to the output of said first data means;
b. the output of said third multivibrator being connected to the respective clock inputs of first and second flip-flop devices; and
c. one output of said first flip-flop device connected to the two data inputs of said second flip-flop device.

5. The device of claim 4 including:
a. an index signal;
b. said index signal coincident with the beginning of said first pair of pulse-width modulated words but not coincident with said second pair of pulse-width modulated words;
c. an index AND gate;
d. said index signal being applied to one input of said index AND gate;
e. the output of said third multivibrator connected to the other input of said index AND gate; and
f. the output of said index AND gate connected to the reset input of said first flip-flop device.

6. The device of claim 4 wherein:
a. said second flip-flop device has first and second outputs wherein when said first output has a signal said second output has no signal and when said second output has a signal said first output has no signal;
b. a first AND gate and a second AND gate;
c. said first output of said second flip-flop device being connected to one input of said first AND gate and said second output of said second flip-flop device being connected to one input of said second AND gate;
d. the output of said first data means connected to the other input of said first AND gate and to the other input of said second AND gate;
e. the output of said first AND gate being connected to the data input of said first shift register; and
f. the output of said second AND gate being connected to the data input of said second shift register.

7. The device of claim 6 including:
a. third and fourth AND gates;
b. the output of said first clocking means connected to one input of said third AND gate and to one input of said fourth AND gate;
c. said first output of said second flip-flop device being connected to the other input of said third AND gate and the second output of said second flip-flop device being connected to the other input of said fourth AND gate; and
d. the output of said third AND gate being connected to the clock input of said first shift register and the output of said fourth AND gate being connected to the clock input of said second shift register.

8. The device of claim 6 including:
a. fifth and sixth AND gates;
b. a second clocking means;
c. the output of said second clocking means connected to one input of said fifth AND gate and to one input of said sixth AND gate; and
d. the second output of said second flip-flop device being connected to the other input of said fifth AND gate and the first output of said second flip-flop device being connected to the other input of said sixth AND gate.

9. The device of claim 8 wherein:
a. the number of pulses in said first pair of pulse modulated words, the number of pulses in said first clock signal, the number of pulses in said second clock signal, the number of bit storage in said first shift register, and the number of bit storage in said second shift register are all the same.

10. The device of claim 7 wherein:
a. said third multivibrator is a latching retriggerable one-shot multivibrator;
b. a latching signal means for generating a latching signal having about the same time duration as the time duration of said second clock signal; and
c. the output of said latching signal means connected to the latching input of said latching retriggerable one-shot multivibrator.

* * * * *